Nov. 11, 1941.  R. H. BUTTERS  2,262,353
MILLING CUTTER
Filed Aug. 22, 1940
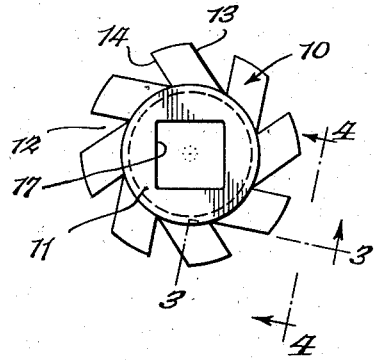
Fig. 1.
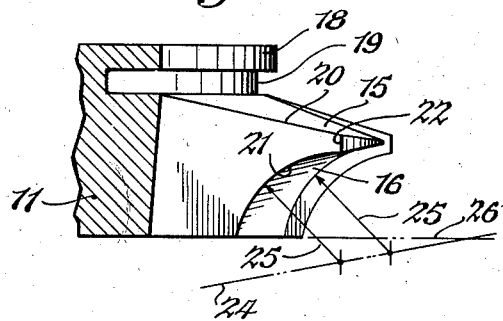
Fig. 3.
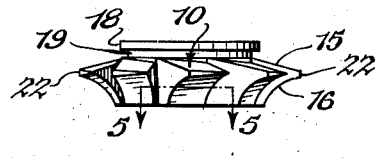
Fig. 2.
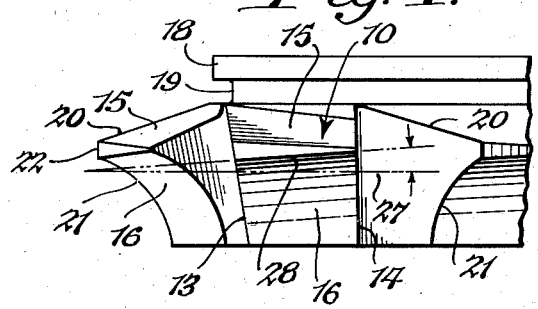
Fig. 4.
Fig. 5.
INVENTOR
Robert H. Butters
BY
John S. Powers
ATTORNEY Patented Nov. 11, 1941

2,262,353

UNITED STATES PATENT OFFICE 2,262,353

MILLING CUTTER

Robert H. Butters, Atlanta, Ga.

Application August 22, 1940, Serial No. 353,662

4 Claims. (Cl. 29—103)

This invention relates to improvements in milling cutters for forming or renewing gin or linter saw teeth in a machine of the type disclosed in the patent to R. H. Butters No. 1,329,036 and according to the method disclosed in the patent to R. H. Butters No. 1,277,375.

In general such cutters, apart from variations in size, number of teeth and spacing, are of the characteristic design disclosed in the patent to R. H. Butters No. 1,346,396. That is to say, they include a hub and a suitable number of radiating teeth, each of which is formed with front, rear, upper and under faces which terminate in a peripheral tip and upper and lower cutting edges which are located in the plane of the front face and which converge from the hub outwardly to the tip, the lower cutting edge being curved concavely in accordance with the desired shape of the backs of the saw teeth and the under face being curved correspondingly so that the lower cutting edge may be sharpened as often as occasion may demand without effecting any substantial change in its contour.

Heretofore, in order to provide relief for the lower cutting edges of the teeth, it has been the practice to form the concave under face of each tooth so that it recedes radially from the front face to the rear face and this has been accomplished in a machine wherein the forming tool is advanced in a direction at right angles to the axis of rotation of the cutter, thereby forming the under face so that a line through the centers of radii from different circumferential points between the front and rear faces will be normal to the cutter axis. I have discovered that, although this method of procedure provides adequate relief for the lower portion of each lower cutting edge, this is not true with respect to the upper portion which has a greater axial inclination, the relief thus provided increasing from a maximum along the lower portion of the cutting edge to a minimum along the outwardly curved upper portion with the attendant result that the latter, despite the fact that it is to be subjected to the greatest strain, is relieved the least. As a consequence of the inadequacy of such relief prior cutters have been noisy in operation; they have had a tendency to form burs on one side of the saw teeth; and their teeth have been subject to frequent breakage owing to excessive wearing in the region of the upper cutting edges.

The principal object of the present invention is to overcome the above objections, this object contemplating a cutter of the type generally described which is so designed that adequate relief will be provided for all portions of the cutting edges of the teeth and thereby insure free and quiet operation of the cutter without burring of the saw teeth.

A further object is to provide a cutter in which the peripheral tips of the teeth are reinforced to resist the severe strains to which they may be subjected in the cutting of the saw teeth without impairing or reducing the effectiveness of the cutter.

The invention is illustrated in the accompanying drawing in which:

Figure 1 is a top view of a cutter embodying the features of the invention.

Figure 2 is a side view of the cutter.

Figures 3 and 4 are enlarged fragmentary views.

Figure 5 is an enlarged section taken along line 5—5 of Figure 2.

The cutter, as illustrated, is of the angular bevel type and includes a suitable number, eight for example, of cutting teeth 10 which radiate from a hub 11, the teeth being separated by V-shaped notches 12 and having front faces 13, rear faces 14, upper faces 15 and under faces 16. A central bore 17 through the hub 11 enables the cutter to be mounted in conventional manner upon the spindle of the milling machine and at the upper side an annular hub extension 18 in the form of a rib is provided for reinforcing purposes, the said rib preferably being formed with an annular recess 19 adjacent the upper faces of the teeth to enable the formation of the required relief on the teeth.

The front and rear faces of each tooth are substantially parallel and the front face is preferably so formed that it extends at a trailing angle with respect to a radial plane through the point of juncture of the front face and the hub, whereby in the operation of the cutter the teeth have a shearing action which will prevent vibration or chattering. The upper faces 15 are substantially flat and radially are inclined downwardly and outwardly. The under faces 16 are concavely curved upwardly and outwardly and they cooperate with the upper and front faces to provide upper and lower cutting edges 20 and 21, respectively, which are located in the planes of the front faces, the upper faces being inclined downwardly and rearwardly in a circumferential direction to provide relief for the upper cutting edges. Each tooth terminates in a triangularly-shaped peripheral tip which recedes radially inwardly from the front face in the direction of the rear face to provide relief for the leading edge 22.

The lower cutting edge of each tooth is a generatrix and the concave curvature thereof is predetermined in accordance with the desired shape of the backs of the saw teeth, the curvature of the under face corresponding substantially to that of the lower cutting edge in order that the curvature of the latter will remain substantially constant despite frequent sharpening. Relief is provided for the lower cutting edge by forming the under face 16 so that the path of the curvature extends in the direction of the upper face in a spiral of diminishing radius. With respect to the lower portions of the lower cutting edge and under face, both of which have a directional inclination with the major component in a plane parallel to the axis of the cutter, it will be noted that the under face recedes inwardly from the front face to the rear face to provide the desired relief, the clearance angle being indicated at 23 in Figure 5.

The inclination of the concavity in the under face in the direction of the upper face is clearly illustrated in Figure 3 wherein such inclination is exaggerated for purposes of clarity and wherein it will be noted that a line 24 through the centers of radii 25 from circumferentially spaced points between the front and rear faces extends angularly with respect to a plane 26 normal to the axis of the cutter, the concavity preferably being so formed that the angle of the line 24 with respect to the plane 26 will be of the order of 7½°, more or less. In other words, the curvature of the under face in any plane parallel to that of the front face is substantially the same but such curvature begins at progressively higher points and is located progressively further inwardly in the direction of the axis of the cutter as planes are selected further and further in a circumferential direction from the front face. As a result, in addition to the substantial relief which is thus provided for the lower portion of the lower cutting edge substantial relief is also provided for the upper portion despite the fact that the latter and the corresponding portion of the under face have a directional inclination with the major component in a plane normal to the axis of the cutter. Thus, referring to Figure 4, it will be noted that with respect to a horizontal plane 27 (a plane normal to the axis of the cutter) the edge 28 of the tip of the tooth is inclined upwardly at a substantial angle. In this connection it is to be understood that although radii and centers are referred to in describing the curvature of the under faces of the teeth it is not intended that these terms be interpreted literally as it will be appreciated that the advantages of the invention may be attained even though portions of the under faces may not be accurately concentric with other portions.

It will be apparent from the foregoing that substantial relief is provided for all portions of the lower cutting edges of the cutter teeth and that such relief will be maintained constant despite frequent sharpening of the teeth. The cutter, therefore, will run freely and quietly and without the formation of burs upon the saw teeth. A further advantage obtained is that the tips of the teeth are adequately reinforced against the strains to which they will be subjected in the sharpening or renewing of saw teeth without impairing or reducing the effectiveness of the cutter.

I claim as my invention:

1. A milling cutter for forming or renewing gin or linter saw teeth and having a hub and a plurality of radiating teeth, each tooth having front, rear, upper and under faces which terminate in a peripheral tip and upper and lower cutting edges which are located in the plane of the front face and which converge from the hub outwardly to the tip, the upper face being inclined downwardly circumferentially away from the plane of the upper cutting edge to provide relief for the said edge and the under face being concavely curved along a circumferential path which extends spirally in the direction of the upper face, whereby to provide a predetermined measure of relief for the upper portion of the lower cutting edge as well as adequate relief for the lower portion.

2. A milling cutter for forming or renewing gin or linter saw teeth and having a hub and a plurality of radiating teeth, each tooth having front, rear, upper and under faces which terminate in a peripheral tip and upper and lower cutting edges which are located in the plane of the front face and which converge from the hub outwardly to the tip, the under face being concavely curved along a circumferential path which extends in the direction of the upper face in a spiral of diminishing radius, whereby to provide a predetermined measure of relief for the upper portion of the lower cutting edge as well as adequate relief for the lower portion.

3. A milling cutter for forming or renewing gin or linter saw teeth and having a hub and a plurality of radiating teeth, each tooth having front, rear, upper and under faces which terminate in a peripheral tip and upper and lower cutting edges which are located in the plane of the front face and which converge from the hub outwardly to the tip, the upper face being inclined downwardly circumferentially away from the plane of the upper cutting edge to provide relief for the said edge and the under face being concavely curved along a circumferential path which extends in the direction of the upper face in a spiral of diminishing radius, whereby to provide a predetermined measure of relief for the upper portion of the lower cutting edge as well as adequate relief for the lower portion.

4. A milling cutter for forming or renewing gin or linter saw teeth and having a hub and a plurality of radiating teeth, each tooth having front, rear, upper and under faces which terminate in a triangularly-shaped peripheral tip and upper and lower cutting edges which are located in the plane of the front face and which converge from the hub outwardly to the tip, the upper face being inclined downwardly circumferentially away from the plane of the upper cutting edge to provide relief for the said edge and the under face being concavely curved along a circumferential path which extends in the direction of the upper face in a spiral of diminishing radius, whereby to provide a predetermined measure of relief for the upper portion of the lower cutting edge as well as adequate relief for the lower portion.

ROBERT H. BUTTERS.